(No Model.)
M. F. HENDERSON.
EGG POACHER.
No. 541,205. Patented June 18, 1895.
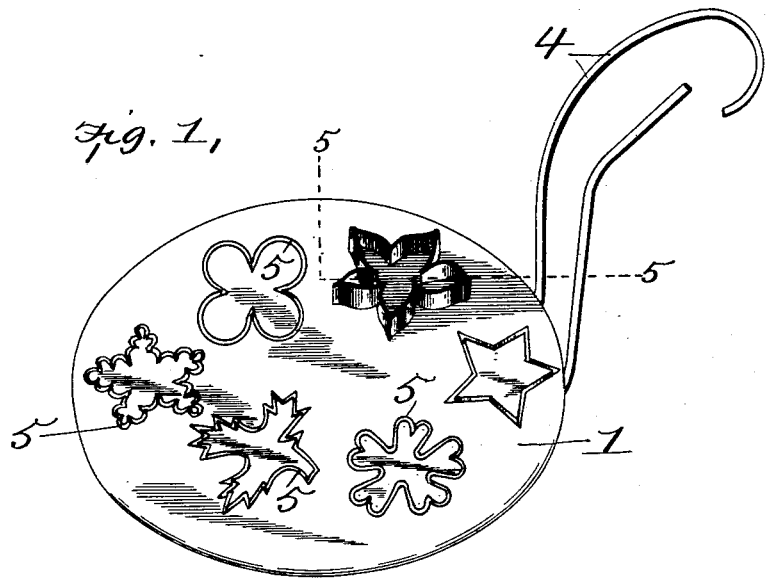
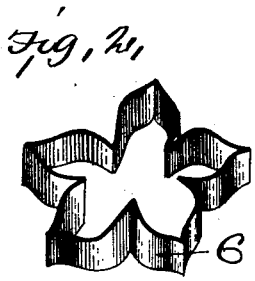
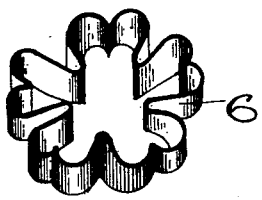
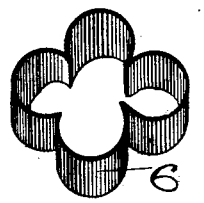
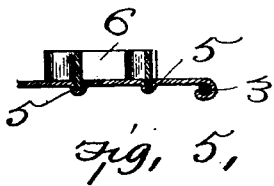
WITNESSES-
J. R. Nottingham
F. A. Loeffler
INVENTOR
Mary F. Henderson

UNITED STATES PATENT OFFICE.

MARY F. HENDERSON, OF WASHINGTON, DISTRICT OF COLUMBIA.

EGG-POACHER.

SPECIFICATION forming part of Letters Patent No. 541,205, dated June 18, 1895.

Application filed April 18, 1895. Serial No. 546,270. (No model.)

*To all whom it may concern:*

Be it known that I, MARY F. HENDERSON, a citizen of the United States, residing at Washington, in the District of Columbia, have invented a new and useful Egg-Poacher; and I do hereby declare the following to be a full, clear, and exact description of the invention, such as will enable others skilled in the art to which it appertains to make and use the same.

The invention relates to certain improvements in egg-poachers; and it consists essentially of a plate provided with grooved forms, of various designs, into which grooves molds of like designs are seated, as will be hereinafter more fully explained and specifically set forth in the claims.

Referring to the accompanying drawings, Figure 1 represents a perspective view of the plate provided with the grooved forms and showing a mold seated in one of said grooved forms; Figs. 2, 3, and 4, perspective views of molds of various designs, and Fig. 5 a vertical section taken on line 5 5 of Fig. 1.

In the several views of the drawings the numeral 1 indicates a metal plate, preferably tin, copper, or granite-ware, and of any suitable size and shape. The under side of the plate, at its outer edge, is provided with a binding wire, 3, the two ends of which project upwardly and outwardly from said plate to form a handle, 4, one of said ends being curved to form a hook, by means of which the utensil may be hung up when not in use. The upper surface of the plate is provided with a number of grooved seats or seals, 5, of various designs, into which are adapted to be seated bottomless molds, 6, of similar design. These molds may be of a size sufficient to hold one or more eggs, and are intended to accurately and closely fit into said grooved seats.

The designs of the molds may be varied as fancy may dictate, it only being necessary that the configuration of the mold and the grooved seat shall correspond, so that when a mold is seated in its seat there shall be a close fit, in order to prevent the egg from running outside of the mold when first poured in, as would be the case where the surface of the plate is perfectly smooth and the molds simply rest thereupon.

In poaching eggs in my improved poacher, I first butter the molds and place them in their respective grooved seats, and immerse them in a pan or dish of boiling water. Each egg is then broken and dropped from the shell into a saucer. The yolk is then lifted, with a spoon, from the white of the egg, which is then poured into a mold. The white of the egg immediately diffuses itself evenly at the bottom of the seated mold, and as the grooved seats are closer to the fire, or other heat, it will be evident that the outer portion of said white of the egg will become instantly coagulated, and any tendency to run under the seated edge of the mold will be prevented. The yolk of the egg is placed in the center of the white, and both are left to cook together, quite immersed in the water. When sufficiently cooked, the poacher is lifted from the pan of water and placed on a table, and a small tin shovel, or cake-lifter, is inserted under a mold to lift it and the egg or eggs contained therein from the plate. Each mold, and its contained egg, is placed upon a slice of buttered toast, which has been previously prepared and placed on a hot platter, and the mold is carefully lifted from the poached egg. The egg is left upon the toast with its configuration unbroken, and the hot water which escapes from the mold serves to slightly moisten the toast which would, otherwise, be too brittle and hard.

Eggs cooked in my improved poacher, present a very attractive appearance when served, and various flower and leaf designs may be made, for instance, by mixing the yolk and white of an egg together and poaching it in the mold, illustrated by Fig. 2, and afterward sprinkling chopped truffles in the center of the poached egg, an ox-eyed daisy may be formed. A wild rose is imitated by coloring the white of the egg, with pink vegetable coloring matter, then poaching it in the mold illustrated by Fig. 3, with the yolk in the center.

When the poacher is not in use, the molds may be kept together by stringing them on the handle, and hanging it in any convenient place.

Having thus fully described my invention, what I claim as new, and desire to secure by Letters Patent, is—

1. In an egg-poacher, the combination of a plate having a coagulating groove or seat, and a bottomless mold or cup having its lower edge so shaped as to coincide with said groove or seat, substantially as specified.

2. In an egg-poacher, the combination of a bottomless mold or cup, and a plate having a continuous groove or seat coinciding with the configuration of the lower edge of said mold or cup, into which groove or seat said lower edge is seated, substantially as specified.

3. An egg-poacher, consisting of a plate having a binding wire around its margin, the ends of said wire constituting a handle and one of the ends being curved and free, whereby it may serve as a supporting-hook or be passed through and sustain the bottomless cups or rings of the poacher, substantially as specified.

MARY F. HENDERSON.

In presence of—
ELLEN HARDIN WALWORTH,
JENNIE WHITE.